United States Patent
Pino Méndez

(10) Patent No.: US 9,827,902 B2
(45) Date of Patent: Nov. 28, 2017

(54) DEVICE FOR PREVENTING ACCIDENTS CAUSED BY REAR-END COLLISIONS AND OPERATING SYSTEM THEREOF

(71) Applicant: Juán José Pino Méndez, Ponteareas (ES)

(72) Inventor: Juán José Pino Méndez, Ponteareas (ES)

(*) Notice: Subject to any disclaimer, the term of this patent is extended or adjusted under 35 U.S.C. 154(b) by 1 day.

(21) Appl. No.: 14/889,785

(22) PCT Filed: Jun. 10, 2014

(86) PCT No.: PCT/ES2014/000093
§ 371 (c)(1),
(2) Date: Nov. 6, 2015

(87) PCT Pub. No.: WO2014/198971
PCT Pub. Date: Dec. 18, 2014

(65) Prior Publication Data
US 2016/0107565 A1    Apr. 21, 2016

(30) Foreign Application Priority Data

Jun. 10, 2013   (ES) .................................. 201300843

(51) Int. Cl.
*B60Q 1/44* (2006.01)
*B60Q 1/46* (2006.01)
*G01S 19/13* (2010.01)

(52) U.S. Cl.
CPC .............. *B60Q 1/448* (2013.01); *B60Q 1/44* (2013.01); *B60Q 1/46* (2013.01); *G01S 19/13* (2013.01)

(58) Field of Classification Search
CPC combination set(s) only.
See application file for complete search history.

(56) References Cited

U.S. PATENT DOCUMENTS

| | | | |
|---|---|---|---|
| 2,824,921 A | 2/1958 | Baumheckel | |
| 2,832,863 A | 4/1958 | Quimby | |
| 3,171,914 A | 3/1965 | Ohanian | |
| 2002/0133282 A1 | 9/2002 | Ryan et al. | |
| 2005/0040702 A1* | 2/2005 | Yen ........................ | B60Q 1/302 303/138 |

FOREIGN PATENT DOCUMENTS

EP        0219858 A2    4/1987

* cited by examiner

*Primary Examiner* — Edward J Pipala
(74) *Attorney, Agent, or Firm* — John Alumit

(57) ABSTRACT

An arrangement for avoiding rear-end collisions and a corresponding operating system formed by a control unit connected with the electronic circuit of the vehicle comprising a signal receiver and a signal generator, which performs the following functions in cooperation with a GPS antenna, an and the third brake light: activation of the third brake light so that it blinks when the vehicle travels on a highway or an expressway at a speed lower than the minimum allowable speed, the accelerator pedal encoder activates the third brake light 0.5 seconds before actuating the brake pedal, and, with a sudden reduction of the vehicle speed, the third brake light is activated.

1 Claim, 1 Drawing Sheet

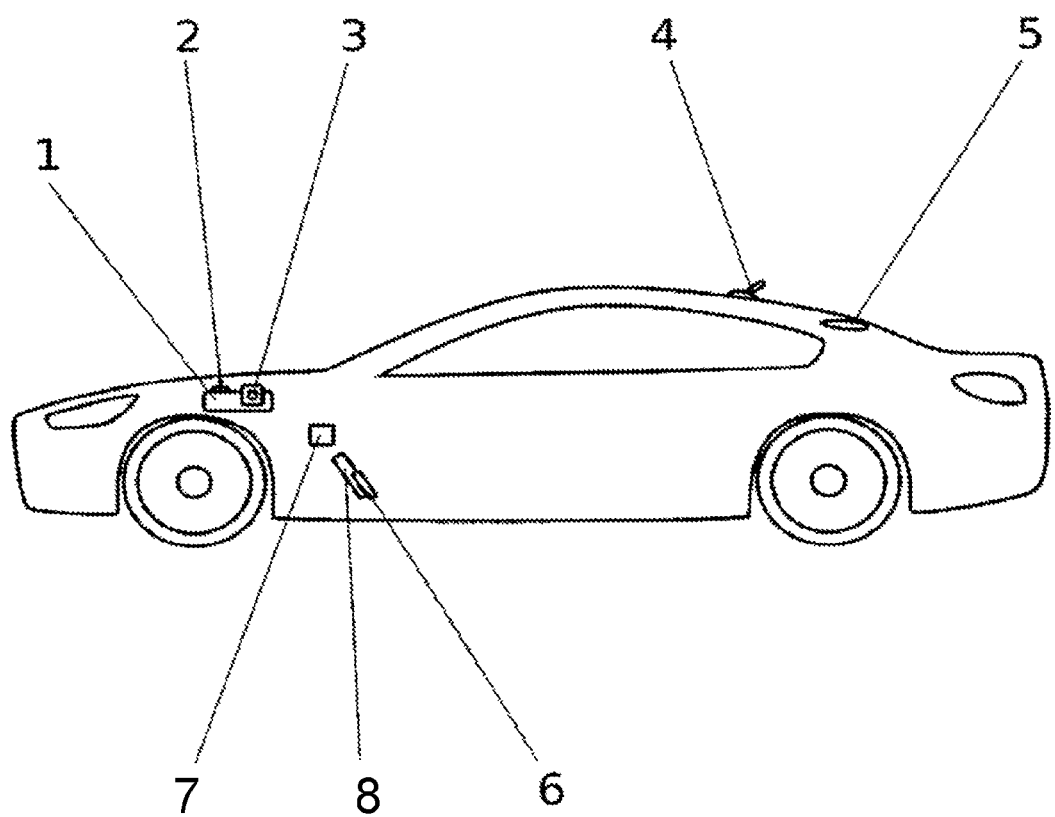

DEVICE FOR PREVENTING ACCIDENTS CAUSED BY REAR-END COLLISIONS AND OPERATING SYSTEM THEREOF

FIELD OF THE INVENTION

The present invention relates to an arrangement which by blinking of the third brake light warns following vehicles that there is a risk of collisions, wherein said signal is issued temporarily based on three assumptions: Firstly, if the preceding vehicle is preparing to brake, secondly, when the preceding vehicle greatly reduced its speed and thirdly, if the traffic flows with unusually low speed.

This invention solves the problem of rear-end collisions, which are generated on roads and highways due to severe braking, due to reduced speed or simply due to braking.

The arrangement according to the invention provides significant advantages over prior art braking signal arrangements, the most important being the simplicity of construction and utilization of electrical and electronic vehicle components.

Another important advantage is the use of the GPS system to recognize the type of road on which the vehicle is traveling in order to cause the control unit to activate the light signal of the third brake light in the event of unusually slow driving on highways and expressways.

BACKGROUND OF THE INVENTION

Currently there exists a system, with which some vehicles are equipped, by means of which the emergency lighting is activated when the ABS system comes into operation at a sudden braking operation. Furthermore, the installation of high-brightness LEDs in the brake lights is known, especially in the third brake light, which are activated within a fraction of a second before of a conventional bulb.

Although no invention was found that is identical with the present invention, the documents retrieved representing the prior art relating to the present invention are described below.

Document ES 2 051 336 T3 relates to a vehicle deceleration warning apparatus which comprises a piezoelectric sensor device connected with the accelerator pedal or the bottom plate for outputting a first signal when subjected to a corresponding load; contact devices, which are connected with each other or with the accelerator pedal or the bottom plate for contacting the piezoelectric sensor upon release of the accelerator pedal, to cause the sensor means to output a first signal in response to the change of the load caused by the contact means to the piezoelectric sensor device; and switching means connected with the brake lights and to the piezoelectric sensor means for analyzing said first signal generated by the piezoelectric sensor means and for actuating the brake lights in response to the analysis when the first signal is above a predetermined threshold value. Although the problem of the deceleration of the preceding vehicle is solved, this is done very differently from the proposed invention.

Document ES 2 138 898 A1 describes an automatic system for preventing accidents in every type of vehicle, which comprises a circuit system connected with the electrical circuit of the vehicle, comprising: at least one integrated circuit comprising a device for detecting the safety distance or the distance between a vehicle and another preceding vehicle and/or an obstacle lying ahead whose distance is related to the speed of the vehicle, wherein commands are automatically triggered in order to slow down and/or stop the vehicle to avoid a collision, and means for temporarily switching off the drive means. Even with its automatism, the problem is certainly not solved with the reliability and simplicity as with the proposed invention.

ES 1 066 558 U shall solve the problem by means of a recording device that records images on a variety of cameras located in the vehicle, a data microprocessor and a warning to the driver of the vehicle in that the cameras record the presence and position of an obstacle in front of or behind the vehicle and send data on the presence and the position of the obstacle to the microprocessor, which calculates the position and the relative speed of the obstacle relative to the vehicle by means of the data obtained by the camera, and emits a warning to the driver in accordance with predetermined values of the position and the relative approaching speed between the obstacle and the vehicle and further enables protective devices according to other predetermined values of the position and the relative approaching speed between the obstacle and the vehicle. The solution is very different to that proposed by the present invention.

DESCRIPTION OF THE INVENTION

The arrangement according to the invention for avoiding rear-end collisions is formed of an electronic control unit which is connected with the electronic circuit of the vehicle, and equipped with a signal receiver and a signal generator and programmed in a way such that the following functions are performed in conjunction with a GPS antenna (4), an accelerator pedal encoder (7) and the third brake light (5):

when the vehicle is traveling on a highway or an expressway at a speed lower than the minimum allowed speed, the control unit receives a signal from the GPS, which is forwarded to the signal generator and activates the LEDs of the third brake light such that it blinks.

0.5 seconds before stepping on the brake pedal, the accelerator pedal encoder detects that the driver of the vehicle has retracted the foot abruptly (x pulses per second) from the accelerator pedal and sends a signal to the control unit, such that the control unit in turn sends a signal to the third brake light such that it blinks.

if there is a sudden decrease in the vehicle speed even without touching or actuating the brake, the control unit receives a signal from the electronic circuit of the vehicle (multiplexing vehicle) or the ABS computer (in the case of non-existent multiplexing) and signals the signal generator to send a signal to the third brake light (5) such that it blinks.

BRIEF DESCRIPTION OF THE DRAWINGS

In the following, reference is made to a FIGURE, which allows to better understand the description of a particular and non-limiting embodiment of the present invention.

FIG. 1: Schematic representation of the vehicle and the reference numbers.

In this FIGURE, the following reference numbers refer to:
1. Control unit
2. Signal receiver
3. Signal generator
4. GPS antenna
5. Third brake light
6. Brake pedal
7. Accelerator pedal encoder
8. Accelerator pedal

DESCRIPTION OF A PREFERRED EMBODIMENT

Hereinafter, a preferred embodiment of the invention, which is only one of a variety of construction methods and which is suitable for industrial realization, as well as an above-described structure will be described.

A preferred embodiment of the arrangement according to the invention for avoiding rear-end collisions can be realized based on an electronic control unit (1) connected with the electronic circuit of the vehicle and which is equipped with a signal receiver (2) and a signal generator (3), and which is programmed in a way that the following functions are carried out in collaboration with the GPS antenna (4), the gas pedal encoder (7) and the third brake light (5):

- when the vehicle is traveling on a highway or an expressway at a speed lower than the minimum allowed speed, the control unit (1) receives a signal from the GPS antenna (4), which is forwarded to the signal generator (3) and activates the LEDs of the third brake light (9) such that it blinks.
- 0.5 seconds before stepping on the brake pedal (6), the accelerator pedal encoder (7) detects that the driver of the vehicle has retracted the foot abruptly (x pulses per second) from the accelerator pedal (8) and sends a signal to the control unit (1), such that the control unit (1) in turn sends a signal to the third brake light (5) such that it blinks.
- if there is a sudden decrease in the vehicle speed even without touching or actuating the brake (6), the control unit (1) receives a signal from the electronic circuit of the vehicle (multiplexing vehicle) or the ABS computer (in the case of non-existent multiplexing) and signals the signal generator (7) to send a signal to the third brake light (5) such that it blinks.

The invention claimed is:

1. An arrangement for avoiding rear-end collisions and a corresponding operating system formed by a control unit (1) connected with an electronic circuit of a vehicle comprising a signal receiver (2) and a signal generator (3), characterized in that the following functions are performed in conjunction with a GPS antenna (4), an accelerator pedal encoder (7) and a third brake light (5)

- when the vehicle is traveling on a highway or an expressway at a speed lower than the minimum posted speed, the control unit receives a signal from the GPS antenna (4), which is forwarded to the signal generator (3) and activates the LEDs of the third brake light (9) such that it blinks;
- 0.5 seconds before stepping on the brake pedal (6), the accelerator pedal encoder (7) detects that the driver of the vehicle has retracted the foot abruptly (x pulses per second) from the accelerator pedal (8) and sends a signal to the control unit (1), such that the control unit (1) in turn sends a signal to the third brake light (5) such that it blinks; and
- if there is a sudden decrease in the vehicle speed even without touching or actuating the brake (6), the control unit (1) receives a signal from the electronic circuit of the vehicle (multiplexing vehicle) or the ABS computer (in the case of non-existent multiplexing) and signals the signal generator (7) to send a signal to the third brake light (5) such that it blinks.

* * * * *